US009851018B2

(12) United States Patent
Almazan et al.

(10) Patent No.: US 9,851,018 B2
(45) Date of Patent: Dec. 26, 2017

(54) RELIEF VALVE WITH POSITION INDICATION

(71) Applicant: Daniel Measurement and Control, Inc., Houston, TX (US)

(72) Inventors: Raul H. Almazan, The Woodlands, TX (US); Michael Richard Adib Zahr, College Station, TX (US); Jack Caruthers, Katy, TX (US); Thomas Henry Loga, Sugar Land, TX (US); David J. Seiler, Spring, TX (US); Justin Blake Crouch, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 14/607,497

(22) Filed: Jan. 28, 2015

(65) Prior Publication Data
US 2015/0219242 A1    Aug. 6, 2015

Related U.S. Application Data

(60) Provisional application No. 61/934,913, filed on Feb. 3, 2014.

(51) Int. Cl.
*F16K 37/00* (2006.01)
*F16K 17/04* (2006.01)

(52) U.S. Cl.
CPC .......... *F16K 37/0041* (2013.01); *F16K 17/04* (2013.01); *Y10T 137/8242* (2015.04)

(58) Field of Classification Search
CPC .......... Y10T 137/785; Y10T 137/8275; F16K 17/04; F16K 37/0041

USPC ........ 137/514, 514.3, 514.7, 528, 535, 538, 137/540, 543.19, 554, 556
See application file for complete search history.

(56) References Cited

U.S. PATENT DOCUMENTS

| | | | | |
|---|---|---|---|---|
| 4,133,288 A | * | 1/1979 | Burgess | F16K 37/0008 116/271 |
| 4,718,450 A | * | 1/1988 | Ezekoye | F16K 17/0433 137/469 |
| 5,333,642 A | * | 8/1994 | Kemp | F16K 37/0033 137/554 |
| 5,472,015 A | * | 12/1995 | Chiou | F16K 1/10 137/556 |

(Continued)

FOREIGN PATENT DOCUMENTS

| | | |
|---|---|---|
| CN | 101354096 A | 1/2009 |
| KR | 101290283 B1 | 7/2013 |

OTHER PUBLICATIONS

PCT/US2015/013255 International Search Report and Written Opinion dated May 12, 2015 (12 p.).

(Continued)

*Primary Examiner* — Reinaldo Sanchez-Medina
(74) *Attorney, Agent, or Firm* — Conley Rose, P.C.

(57) ABSTRACT

A surge relief valve includes a piston housing and a piston located within the housing for reciprocal motion. The surge relief valve also includes a position sensor to resolve the axial position of the piston relative to the piston housing. The position sensor includes a sensor body coupled to the piston housing and a movable element configured to move linearly relative to the sensor body and configured to move axially with the piston. At a least portion of the sensor body is located within the piston housing.

16 Claims, 2 Drawing Sheets

(56) References Cited

U.S. PATENT DOCUMENTS

| | | | | |
|---|---|---|---|---|
| 5,694,117 | A * | 12/1997 | Sugarek | F16K 17/04 |
| | | | | 137/554 |
| 7,124,774 | B2 * | 10/2006 | Weingarten | F16K 31/1266 |
| | | | | 137/514.7 |
| 7,302,961 | B2 * | 12/2007 | Martin | F16K 17/02 |
| | | | | 137/14 |
| 7,748,401 | B2 * | 7/2010 | Zecchi | G05D 16/0647 |
| | | | | 137/315.05 |
| 8,322,359 | B2 * | 12/2012 | Zecchi | G05D 16/0647 |
| | | | | 137/15.18 |
| 2005/0087232 | A1 | 4/2005 | Kugelev et al. | |
| 2005/0269543 | A1 | 12/2005 | McCarty et al. | |
| 2006/0042696 | A1 | 3/2006 | Martin et al. | |
| 2009/0283709 | A1 | 11/2009 | Bey | |
| 2010/0281997 | A1 * | 11/2010 | Jones, III | F16K 17/065 |
| | | | | 73/861.42 |
| 2011/0259546 | A1 | 10/2011 | DeFrancesco et al. | |
| 2013/0291968 | A1 * | 11/2013 | Clark | F16K 37/0008 |
| | | | | 137/556 |
| 2014/0137960 | A1 * | 5/2014 | Adams | F16K 31/1221 |
| | | | | 137/553 |

OTHER PUBLICATIONS

"SRV Monitoring . . . Wireless Solution: Field Testing," Emerson Global Users Exchange (6 p).

"Micropulse Linear Position Transducer," Balluff Sensors Worldwide, Technical Description/User's Guide, www.balluff.com (16 p.).

"TA12 Explosion Proof: Non-Contact, Wear-Free Magnetostrictive Technology for Long MTBF," Balluff Sensors Worldwide, www.balluff.com (8 p.).

"Daniel 762/762/765/766/767 Liquid Control Valve," Daniel/Emerson Process Management, www.emersonprocess.com, Oct. 2013 (16 p.).

"Penny+Giles ICT050 Contactless In-Cylinder Linear Transducer," Penny+Giles, http://www.pennyandgiles.com/Products/Linear-Position-Sensors/Contactless-In-Cylinder-Linear-Transducer-ICT050. aspx (accessed Jan. 28, 2015) (6 p.).

Excerpt of Technical Guide entitled "Daniel Liquid Control Valves Technical Guide," DAN-LIQ-TG-44-rev0208, Feb. 2008 (15 p.).

Chinese 2nd Office Action and Search Report dated Jun. 23, 2017, for application No. CN 201510055774.9 and English translation.

* cited by examiner

RELIEF VALVE WITH POSITION INDICATION

CROSS-REFERENCE TO RELATED APPLICATIONS

This application claims benefit of U.S. provisional patent application Ser. No. 61/934,913 filed Feb. 3, 2014, and entitled "Relief Valve with Position Indication," which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates generally to monitoring the discharge of a fluid from a relief valve. More particularly, the disclosure relates to an apparatus for indicating the status of a relieve valve, in particular, the degree to which the valve is open.

Background Information

Industrial processes and pipelines for fluids utilize surge relief valves to protect against injury or damage due to unwanted or sudden increases in fluid pressure or flow rate, which will also be referred to as process-upsets. A surge relief valve is coupled to a process vessel or a process line, i.e. piping, for which protection is needed. When the vessel or the flow line experiences a process-upset, the surge relief valve opens to relieve the process pressure. The portion of fluid discharged through the surge relief valve is typically directed to a storage tank, to another pipeline, to another portion of the industrial process, or to the environment. If directed to a storage tank, the discharged fluid may be subsequently measured and pumped back into the process or the pipeline. In comparison, for many types of fluids, environmental discharges from a surge relief valve are more challenging and require submitting a report to one or more government agencies and possibly paying a monetary fine, influenced by the total amount of fluid discharged, which is roughly estimated. For any destination of the discharged process fluid, it would be advantageous to have equipment or a method for performing a higher-quality estimation, or for making a measurement of the amount of process fluid that discharges from a surge relief valve without the addition of a traditional flow meter, which would impose an additional flow restriction and perhaps an undesired level of cost.

BRIEF SUMMARY OF THE DISCLOSURE

These and other needs in the art are addressed in one embodiment by a surge relief valve. In an embodiment, the surge relief valve includes a piston housing having longitudinal axis. In addition, the surge relief valve includes a piston disposed within the housing and configured for reciprocal motion along the axis. Further, the surge relief valve includes a position sensor configured to resolve the axial position of the piston relative to the piston housing. In an embodiment, the position sensor includes a sensor body coupled to the piston housing and a movable element configured to move linearly relative to the sensor body and configured to move axially with the piston. At least a portion of the sensor body is disposed within the piston housing, and the sensor is configured to generate a response that correlates to the position of the piston relative to the piston housing.

In another embodiment, a back-pressure valve for intermittently allowing fluid flow to pass includes a piston housing having a head portion and a hollow extension coupled to the head portion. The extension has an open end opposite the head portion. The back-pressure valve also includes a valve seat located at the open end of the piston housing. The back-pressure valve further includes a piston disposed in the housing and configured for reciprocal motion relative to the piston housing. The piston has a first end disposed proximal the head portion and a second end proximal the valve seat. In addition, the back-pressure valve includes a biasing member disposed between the piston and the piston housing and configured to bias the piston in a direction away from the head portion and toward the valve seat. Still further, the back-pressure valve includes a position sensor having a first sensor element coupled to the piston housing and a second sensor element configured to move linearly relative to the first sensor element and to follow the reciprocal movements of the piston. The first sensor element is configured to generate a response when the piston second sensor element moves relative to the piston housing. A least a portion of the first sensor element is disposed within the piston housing.

In another embodiment, a surge relief valve system for coupling to a fluid source to protect against injury and damage due to a potential process-upset includes a surge relief valve for intermittently allowing fluid flow therethrough in response to the process-upset. The valve includes a piston housing having longitudinal axis; and a piston disposed within the housing and configured for reciprocal motion along the axis. The surge relief valve system also includes a linear position sensor comprising a sensor body coupled to the piston housing and a sensor element coupled to the sensor body. A least portion of the sensor element is disposed within the piston housing. The sensor element is configured to generate a response that correlates to the position of the piston relative to the piston housing.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings in which.

NOTATION AND NOMENCLATURE

Figure 1:
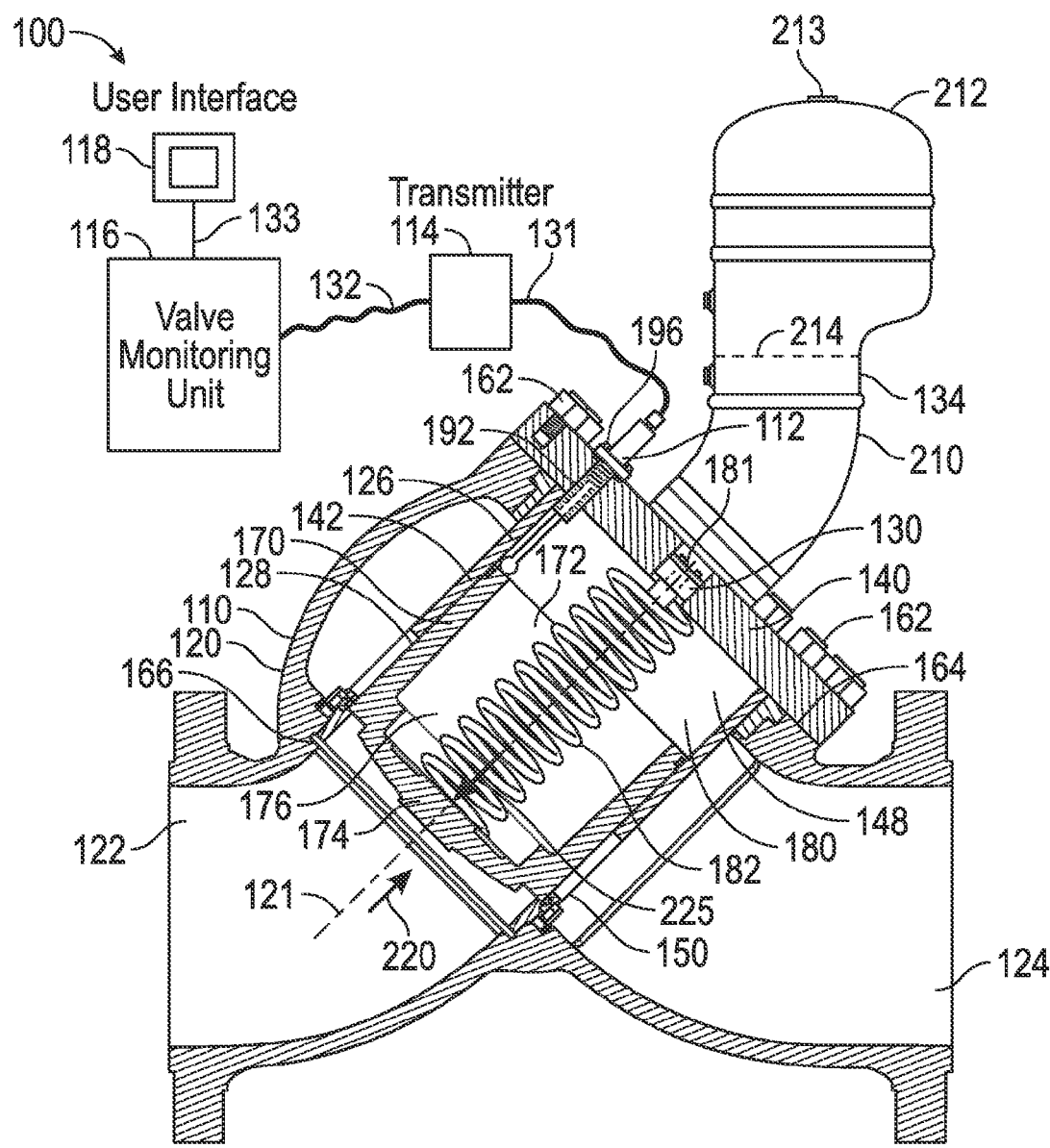
FIG. 1 is a side view, in partial cross-section, of a surge relief valve system, including a surge relief valve having a position sensor, in accordance with principles described herein.

The following description is exemplary of certain embodiments of the disclosure. One of ordinary skill in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, among the drawings, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors.

In addition, as used herein including the claims, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to a given axis, and a radial distance means a distance measured perpendicular to the axis.

Any reference to a relative direction or relative position with respect to an object, for example "top," "bottom," "up", "upward," "upper," "left," "leftward," "down", "lower", and "clock-wise", is made for purpose of clarification and pertains to the orientation as shown in a figure of the specification. If the object were viewed from another orientation, it may be appropriate to described direction or position using an alternate term.

DETAILED DESCRIPTION OF THE DISCLOSED EMBODIMENTS

FIG. 1 shows an exemplary embodiment of a surge relief valve system 100 configured to be installed in an industrial process or coupled to another fluid source to protect against injury and damage due to potential, unwanted, unexpected, or sudden increases in pressure or flow rate of a process fluid during what may be called a process-upset. System 100 may attach to or couple to a pipe, a pipeline, or a vessel, as examples of a fluid source needing protection. System 100 is configured to release the elevated pressure or flow, and to indicate, estimate, measure, or record a relative or a quantitative flow rate or total amount of fluid released from the industrial process or other fluid source.

The surge relief valve system 100 includes a surge relief valve 110, a transmitter 114, a valve monitoring unit 116, and a user interface 118. In some embodiments, valve 110 may also be called a back-pressure valve or a back-pressure control valve. The surge relief valve 110 further includes a variable, linear position sensor 112 that extends into the valve 110, a valve body 120, a valve axis 121, an inlet port 122, an outlet or discharge port 124, a piston housing 126 disposed within the valve body 120, a piston 128 disposed within the housing 126 and configured for reciprocal motion along axis 121, a pressure-compensated, releasable check valve 130 coupled to the piston housing 126, and a fluid reservoir 134 coupled to and in fluid communication with piston housing 126. Position sensor 112 extends into the piston housing 126 and is configured to indicate or to measure the axial position of the piston 128 relative to the piston housing 126. Rather than merely providing a valve open-or-closed indication, position sensor 112 resolves the axial position of the piston 128 relative to piston housing 126 and fluid ports 150, i.e. the degree to which valve 110 is open. Inlet port 122 of surge relief valve 110 is configured to couple a vessel or a line, i.e. piping, (not shown) of the industrial process for fluid communication. Surge relief valve 110 is configured to prevent or reduce the potential for a process fluid within inlet port 122, i.e. within the process vessel or a line, from exceeding a prescribed pressure limit. Because fluid reservoir 134 is configured to contain pressurized fluid to influence the movement of piston 128, surge relief valve 110 is also known as a gas-loaded relief valve or gas-loaded back-pressure control valve.

A first communication connection 131 couples position sensor 112 to transmitter 114, and a second communication connection 132 couples transmitter 114 to valve monitoring unit 116. A third communication connection 133 couples valve monitoring unit 116 to the user interface 118. Any of the communication connections 131, 132, 133 may be any appropriate connection, such as a wired or a wireless connection, for example, and may include a network connection for transmitting data over a local area network or across the world-wide-web, for example. In some instances, transmitter 114 is configured as a wireless transmitter for wireless communication with valve monitoring unit 116. In some instances, valve monitoring unit 116 is configured as a wireless transmitter for wireless communication with user interface 118. In some embodiments, transmitter 114 is configured as an integral part of position sensor 112 so that first communication connection 131 is internal to or is a part of position sensor 112.

Figure 2:
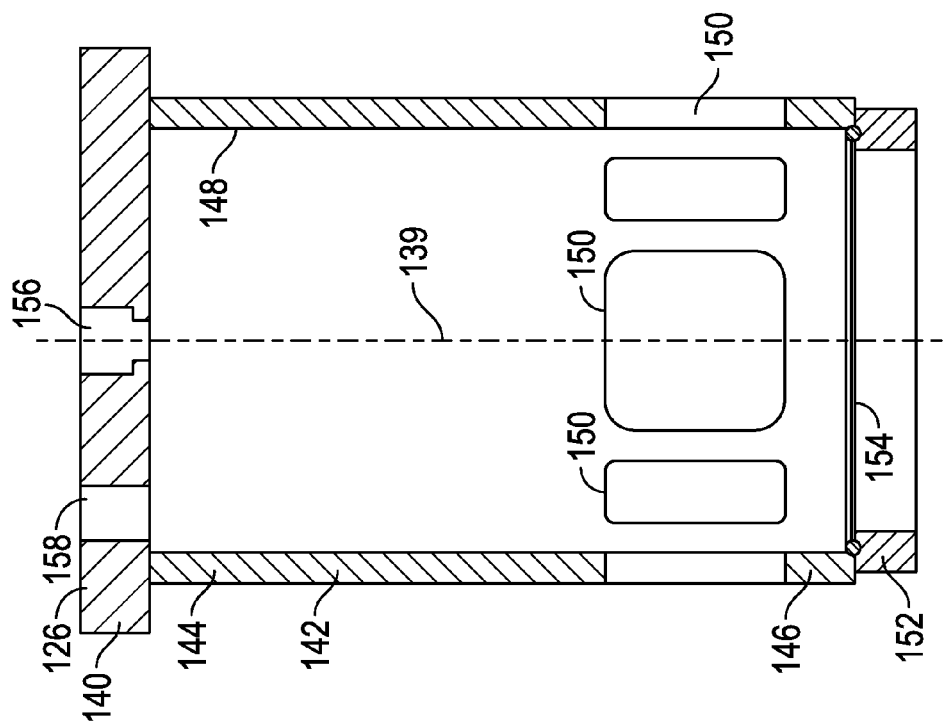
FIG. 2 is a side view, in cross-section, of the piston housing in FIG. 1 in accordance with principles described herein.

Referring now to FIG. 2, piston housing 126 includes a longitudinal axis 139 to be aligned with valve axis 121, a removable head portion 140, and a hollow extension 142. As assembled, housing extension 142 extends from head portion 140. Housing extension 142 includes an upper or closed end 144 removably coupled to head portion 140, a lower or open end 146 opposite the head portion, and a generally cylindrical cavity 148 extending between ends 144, 146. In this embodiment, the hollow housing extension 142 is generally cylindrical and is configured as a tubular member. A plurality of fluid ports 150 extend radially through the sidewall of housing extension 142, and intersect cavity 148. Although a total of eight fluid ports 150 are indicated by the sectional view of FIG. 2, in practice, any suitable number of fluid ports 150 may be formed in the sidewall of extension 142. A valve seat 152 and an annular seal 154 are disposed at the open end 146. Annular seal 154 may be, for example, an O-ring made of resilient material. Head portion 140 includes a centrally located control port 156 and a radially-offset aperture 158. Both control port 156 and aperture 158 extend to chamber 148 of housing extension 142.

In the embodiment of FIG. 1 and FIG. 2, piston housing 126 is configured to be inserted into and removed from valve body 120. Fasteners 162 extending through head portion 140 couple the piston housing 126 to valve body 120 at a face 164. The open end 146 of housing extension 142 or the valve seat 152 engages with an annular retaining ledge 166 within valve body 120 located adjacent inlet port 122. Held by fasteners 162, head portion 140 exerts a compressive force against housing extension 142, and retaining ledge 166 provides a reaction force to couple housing extension 142 to head portion 140. In some embodiments, additional fasteners or fastening mechanisms couple housing extension 142 to head portion 140.

In some embodiments, cavity 148 or hollow extension 142 of piston housing 126 is formed as an integral part of valve body 120 rather than being a separate, removable member. Thus, in various embodiments, valve body 120 may be described as including a piston housing, or piston housing 126 may be described as including a valve body.

Referring again to FIG. 1, piston 128 includes a generally cylindrical body 170, an open end 172, a closed end 174 located opposite the open end 172, and an internal cavity 176 extending between ends 172, 174. Piston 128 is disposed within cavity 148 of piston housing 126 with piston open end 172 located proximal head portion 140 and closed end 144 of housing extension 142. The piston closed end 174 is proximal the valve seat 152 and is distal the head portion 140. Piston internal cavity 176 and the upper portion of cavity 148 form a variable volume chamber 180 extending between the inner side of piston closed end 174 and head portion 140. Chamber 180 is in fluid communication with control port 156. Check valve 130 is located within control port 156 to regulate the flow rate of fluid exchange between chamber 180 and fluid reservoir 134. Check valve 130 allows fluid to flow in either direction relative to axis 121. Check valve 130 includes plate 181 with a fixed orifice, providing a fixed flow area for a working fluid in valve 110 to travel from fluid reservoir 134 to chamber 180 as piston 128 returns towards valve seat 152, closing valve 110. When valve 110 opens, plate 181 can move away from the remainder of valve 130 and away from piston 128, providing a larger flow area through check valve 130 as working fluid travels from chamber 180 to fluid reservoir 134.

A biasing member 182 is disposed between piston 128 and piston housing 126 and is configured to bias piston 126 in a direction away from the head portion 140 and toward valve seat 152. In FIG. 1, biasing member 182 is shown as a coiled compression spring.

Figure 3:
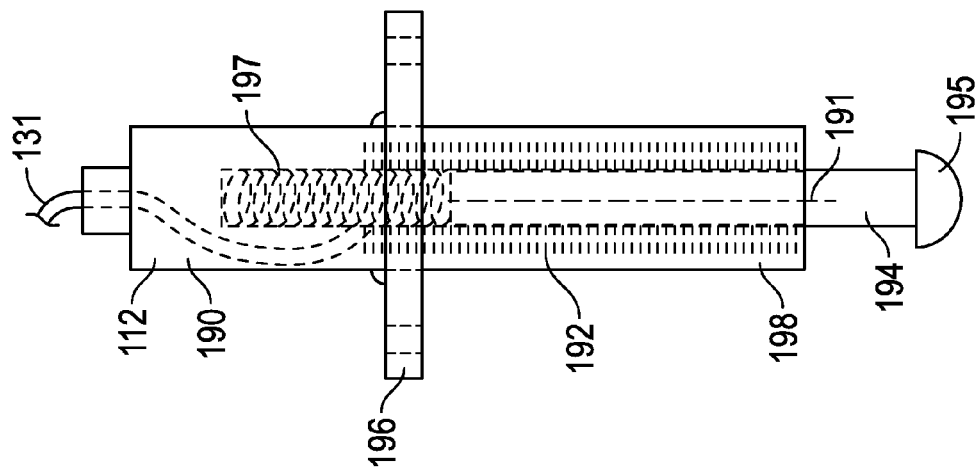
FIG. 3 is a schematic view of the position sensor in FIG. 1 in accordance with principles described herein.

An embodiment of position sensor 112 is shown schematically in FIG. 3. Position sensor 112 is a linear transducer and includes a sensor body 190, a longitudinal axis 191, a transducing sensor element 192 within body 190, and a movable element 194 configured to move along axis 191 linearly relative to sensor element 192, and a biasing member 197 configured to urge movable element 194 away from body 190. In the schematic, biasing member 197 is shown as a coiled compression spring. Movable element 194 may also be called a second sensor element. In the example of FIG. 3, the movable element 194 is a plunger rod slidingly received within and extending from the sensor body 190. The plunger rod includes a contact-end 195 that is distal the sensor body 190 and has a smooth, rounded surface. A flange 196 is coupled to sensor body 190 by welding, for example, and is spaced away from lower end 198 so that sensor body 190 is configured to extend into head portion 140 or chamber 180 (FIG. 1). In some embodiments, sensor body 190 is entirely disposed within piston housing 126.

Referring again the FIG. 1, flange 196 sealingly couples position sensor 112 to head portion 140, aided, for example, by fasteners and an O-ring seal or another sealing member. In some embodiments, lower end 198 is threaded and aperture 158 in piston housing 126 is also threaded to receive lower end 198. At least a portion of the sensor element 192 is disposed within the piston housing 126, e.g. within head portion 140 or within chamber 180. Contact end 195 of plunger rod 194, i.e., the movable element, extends to the radially-extending, annular surface of piston end 172. Due to the action of biasing member 197, plunger rod 194 is biased toward the piston so contact end 195 engages piston 128 so as to touch piston 128 and is thereby configured to move axially with the piston 128, i.e. to follow the reciprocal movements of piston 128. However, plunger rod 194 is not attached or otherwise coupled to the piston 128, and so piston 128 can push plunger rod 194 toward head portion 140 but cannot pull plunger rod 194 toward valve seat 152. With sensor elements 192, 194, sensor 112 can detect and resolve the broad or incremental movements of piston 128 along valve axis 121 and relative to fluid ports 150. In other embodiments, the movable element 194 is coupled or attached to piston 128 by a connection that allows piston 128 both to push and to pull movable element 194.

A measurable, detectable property of the transducing sensor element 192 varies when movable element 194 moves linearly relative to sensor element 192 along axis 191. In general, the variable, measurable property of sensor element 192 may be electrical resistance, electrical inductance, electrical capacitance, a voltage difference, a current output, a measurement of distance, or another suitable property that is detectable at first communication connection 131 by transmitter 114. Thus, sensor 112 or, more specifically, sensor element 192 is configured to generate a variable response or variable response signal when the plunger rod 194 moves relative to sensor element 192 and sensor body 190. The response may be correlated to the position of the movable element 194 relative to the sensor element 192. The response of sensor 112 may be an analog or digital signal, for example. The response of sensor 112 in valve 110 varies monotonically as piston 128 moves in one direction along axis 121, between valve seat 152 and head portion 140, with plunger rod 194 following piston 128. The response of sensor 112 again varies monotonically as piston 128 moves in the opposite direction along axis 121. Sensor 112 can detect and resolve movement of piston 128 in either direction along axis 112. The direction of movement can be determined from the response of sensor 112. In the example of FIG. 1, sensor 112 may be a linear variable differential transformer (LVDT) so that the response of sensor element 192 to the movement of plunger rod 194 in one direction or to movement in the other direction is both monotonic and linear.

Fluid reservoir 134 is hollow and includes an elbow 210 extending upward from head portion 126 and a pressure chamber 212 coupled to elbow 210 for fluid communication. Reservoir 134 is in fluid communication with control port 156, check valve 130, and variable volume chamber 180. A first working fluid, such as incompressible oil, for example, fills chamber 180 and a portion of reservoir 134. The remainder of reservoir 134, i.e. the upper portion of pressure chamber 212, is filled with a second, compressible working fluid, such as nitrogen, for example. A fitting 213 on pressure chamber 212 allows the pressure of the compressible working fluid to be monitored or adjusted externally. Though the fluids are not directly shown in FIG. 1, a fluid boundary 214 between the first working fluid and the compressible working fluid is indicated. The indicated location of boundary 214 is representative of various possible locations. The location of boundary 214 varies based on the selected quantities of the two fluids and based on the variable position of piston 128 relative to head portion 126. The pressure and volume of the compressible fluid varies depending, at least in part, on the position of piston 128 relative to head portion 126. When surge relief valve 110 is installed for operation, boundary 214 and therefore at least a portion of reservoir 134 are located vertically above head portion 126 and above chamber 180 to reduce or inhibit the entry of the compressible working fluid into chamber 180.

During operation of surge relief valve 110, inlet port 122 is coupled to process equipment (not shown) and is exposed to a process fluid (not shown) that may experience variations in pressure. The process fluid within inlet port 122 exerts an opening-force 220 across the outside of the piston closed end 174, attempting to move piston 128 towards head portion 140. However, spring 182 and the pressure of first and second working fluids located in chamber 180 and fluid reservoir 134 exert a counteracting, closing-force 225 on piston 128 to bias piston 128 toward valve seat 152 and seal 154. During normal conditions, this closing-force 225 exceeds the opening-force 220 of the process fluid at inlet port 122, and, consequently, piston 128 remains seated and sealed against valve seat 152 and seal 154. In such situations, the valve is closed, as shown in FIG. 1. An upper pressure limit for the process fluid within inlet port 122 is prescribed at least in part by the spring constant (i.e. strength) of spring 182 and the pressure of the first and second working fluids when surge relief valve 110 is closed.

In some instances, the pressure of the process fluid within inlet port 122 rises and exerts an opening-force 220 that exceeds the closing-force 225. I.e., the pressure of the process fluid exceeds the prescribed upper pressure limit established for surge relief valve 110. Consequently, piston 128 compresses spring 182 and the working fluids in chamber 180 and reservoir 134. Piston 128 moves toward head portion 140, with closed end 174 sliding past and opening portions of the fluid ports 150. As a result, valve 110 opens, i.e. inlet port 122 establishes fluid communication with fluid ports 150 and discharge port 124, allowing process fluid to flow from the higher pressure zone of inlet port 122 to the lower pressure zone of discharge port 124. The pressure of the process fluid in inlet port 122 and the degree to which fluid ports 150 are open influence the flow rate of process fluid from inlet port 122 to discharge port 124. The degree to which the valve 110 and fluid ports 150 are open is indicated or measured by position sensor 112, which senses the axial movement of piston 128 relative to piston housing 126.

A response from sensor 112 is received or detected by transmitter 114 and is sent to valve monitoring unit 116, which is configured to evaluate or quantify the flow rate of the process fluid passing from inlet port 122 through discharge port 124, based on the degree to which the fluid ports 150 are open. Likewise, valve monitoring unit 116 is configured to perform a time-based integration of the fluid passing through valve 110 in order to evaluate or quantify the total amount of fluid discharge. The flow rate of process fluid passing through discharge port 124 is processed or stored in valve monitoring unit 116 and may be displayed on user interface 118. In this way, position sensor 112 of system 100 provides a means by which to indicate, estimate, measure, or record a relative or a quantitative flow rate or total amount of process fluid passing through discharge port 124.

The flow of process fluid from inlet port 122 to discharge port 124, as described, reduces the pressure of the remaining process fluid within inlet port 122. Eventually, the closing-force 225 again exceeds the opening-force 220, and piston 128 again engages valve seal 152, closing valve 110.

Thus, valve 110 intermittently allows fluid flow therethrough based on the pressure of the process fluid at valve inlet 122 and the characteristics of valve 110, e.g. the spring constant of spring 182 and the pressure of the first and second working fluids in fluid reservoir 134. Variable position sensor 112 resolves and generates a response that correlates to the degree to which valve 110 is open and the rate of fluid flow through discharge port 124.

Additional embodiments are contemplated and some share characteristics of one or more of the previously-described embodiments. In addition, a method for monitoring the degree to which a relief valve is open may be developed based on the features and operations of the various embodiments, in accordance with principles described herein.

Although in the exemplary embodiment of variable position sensor 112, the movable element 194 is a plunger rod slidingly received within and extending from the sensor body 190; in various embodiments, the movable element (or second sensor element) may be configured differently. For example, the movable element may be a magnetic member configured to move along the outside of a rod-like portion of the sensor body containing the first sensor element 192. The magnetic member may be held at a fixed position relative to piston 128, possibly near the middle of lower end 174 or along the sidewall of body 170.

Although certain activities were attributed to valve monitoring unit 116, in some embodiments other components are configured to perform or to share these activities. For example, in various embodiments one or more of the sensor 112, transmitter 114, valve monitoring unit 116, user interface 118, or a separate component coupled for communication surge relief valve system 100 is configured to evaluate or to share the evaluation of the flow rate or the total amount of the process fluid passing from inlet port 122 through discharge port 124. Thus, it is also feasible to consider that the valve monitoring unit 116 may be distributed among various components, such as sensor 112, transmitter 114, and user interface 118, for example.

In an embodiment, the surge relief valve includes a piston housing having longitudinal axis and includes a piston disposed within the housing and configured for reciprocal motion along the axis. The surge relief valve also includes a position sensor configured to resolve the axial position of the piston relative to the piston housing. In at least some embodiments, the position sensor includes a sensor body coupled to the piston housing and a movable element configured to move linearly relative to the sensor body and configured to move axially with the piston. At least a portion of the sensor body is disposed within the piston housing, and the sensor is configured to generate a response that correlates to the position of the piston relative to the piston housing.

In some embodiments of the surge relief valve, the movable element is a plunger rod slidingly received by the sensor body, and the plunger rod comprises a contact-end distal the sensor body, the contact-end engaging the piston.

In some embodiments, the position sensor further comprises a biasing member configured to bias the contact-end into engagement with the piston. In some embodiments, the biasing member is a spring. In some embodiments having a biasing member, the plunger rod extends from the sensor body, and the plunger rod is not attached to the piston.

In some embodiments, the movable element is entirely disposed within the piston housing.

In some embodiments, the position sensor of the surge relief valve further includes a sensor element disposed in the sensor body, and the sensor element is configured to generate a response that correlates to the position of the movable element relative to the sensor body; and a least a portion of the sensor element is disposed within the piston housing. In some embodiments, the movable element includes a magnetic member.

In another embodiment, a back-pressure valve for intermittently allowing fluid flow to pass includes a piston housing having a head portion and a hollow extension coupled to the head portion. The extension has an open end opposite the head portion. The back-pressure valve also includes a valve seat located at the open end of the piston housing. The back-pressure valve further includes a piston disposed in the housing and configured for reciprocal motion relative to the piston housing. The piston has a first end disposed proximal the head portion and a second end proximal the valve seat. In addition, the back-pressure valve includes a biasing member disposed between the piston and the piston housing and configured to bias the piston in a direction away from the head portion and toward the valve seat. Still further, the back-pressure valve includes a position sensor having a first sensor element coupled to the piston housing and a second sensor element configured to move linearly relative to the first sensor element and to follow the reciprocal movements of the piston. The first sensor element is configured to generate a response when the piston second sensor element moves relative to the piston housing. A least a portion of the first sensor element is disposed within the piston housing.

In some embodiments of the back-pressure valve, the second sensor element engages the piston first end.

In some embodiments of the back-pressure valve, the position sensor further comprises a sensor body in which the first sensor element is disposed, and the second sensor element comprises a plunger rod slidingly received by the sensor body and configured to follow the reciprocal motion of the piston. In some embodiments, the position sensor further comprises a biasing member configured to bias the plunger rod into engagement with the piston; and the plunger rod is not attached to the piston. In some embodiments, the piston is generally cylindrical, and the plunger rod includes a contact end to allow the piston to rotate independently of the plunger rod.

In another embodiment, a surge relief valve system for coupling to a fluid source to protect against injury and damage due to a potential process-upset includes a surge relief valve for intermittently allowing fluid flow therethrough in response to the process-upset. The valve includes a piston housing having longitudinal axis; and a piston disposed within the housing and configured for reciprocal motion along the axis. The surge relief valve system also includes a linear position sensor comprising a sensor body coupled to the piston housing and a sensor element coupled to the sensor body. A least portion of the sensor element is disposed within the piston housing. The sensor element is configured to generate a response that correlates to the position of the piston relative to the piston housing.

In some embodiments, the surge relief valve system further includes a transmitter coupled for communication with the sensor element, and a valve monitoring unit coupled for communication with the sensor element and the transmitter and configured to quantify the fluid flow passing through the valve. In some embodiments, the transmitter is disposed within the sensor.

In some embodiments of the surge relief valve system, the linear position sensor further comprises a movable element configured to follow the reciprocal motion of the piston while allowing the piston to rotate about the axis, and the response of the sensor element is correlated to the position of the movable element relative to the sensor element. In some embodiments, the movable element comprises a plunger rod slidingly coupled to the sensor body and having rounded contact end to touch the piston.

In some embodiments of the surge relief valve system, the linear position sensor further comprises a movable element disposed at a fixed position relative to the piston and configured to follow the reciprocal motion of the piston in two axial directions, and the response of the sensor element is correlated to the position of the movable element relative to the sensor element.

While exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily indicate that the particular step or operation is necessary to the method. Unless expressly stated otherwise, the steps or operations listed in a description of a method or in a method claim may be performed in any order, and in some implementations two or more of the method steps or operations may be performed in parallel, rather than serially.

What is claimed is:

1. A surge relief valve comprising: a piston housing having a longitudinal axis; a piston disposed within the housing and configured for reciprocal motion along the axis; and an electrical position sensor configured to resolve axial positions of the piston relative to the piston housing, the position sensor comprising: a sensor body coupled to the piston housing; and a movable electrical element including a plunger rod slidingly received by the sensor body to move linearly relative to the sensor body and axially with the piston, the plunger rod comprising a contact-end distal the sensor body to engage the piston; wherein at least a portion of the sensor body is disposed within the piston housing; and wherein the sensor is configured to generate an electrical response that correlates to the position of the piston relative to the piston housing.

2. The surge relief valve of claim 1 wherein the electrical position sensor further comprises a biasing member configured to bias the contact-end into engagement with the piston.

3. The surge relief valve of claim 2 wherein the biasing member is a spring.

4. The surge relief valve of claim 2 wherein the plunger rod extends from the sensor body and wherein the plunger rod is not attached to the piston.

5. The surge relief valve of claim 1 wherein the movable electrical element is entirely disposed within the piston housing.

6. The surge relief valve of claim 1 wherein the electrical position sensor further comprises an electrical sensor element disposed in the sensor body and configured to generate the electrical response of the sensor;

wherein the electrical response correlates to a position of the movable electrical element relative to the sensor body; and wherein at least a portion of the electrical sensor element is disposed within the piston housing.

7. The surge relief valve of claim 1 wherein the movable electrical element comprises a magnetic member.

8. A back-pressure valve for intermittently allowing fluid flow therethrough, the back-pressure valve comprising: a piston housing comprising a head portion and a hollow extension coupled thereto, the extension having an open end opposite the head portion; a valve seat disposed at the open end; a valve piston disposed in the housing, configured for reciprocal motion relative to the piston housing, and having a first end disposed proximal the head portion and a second end proximal the valve seat; a biasing member disposed between the valve piston and the piston housing and configured to bias the valve piston in a direction away from the head portion and toward the valve seat; an electrical position sensor comprising: a first sensor element disposed in a sensor body coupled to the piston housing; and a second sensor element including a plunger rod slidingly received by the sensor body to move linearly relative to the first sensor element, the plunger rod comprising a contact-end distal the sensor body to engage the valve piston and follow the reciprocal movements of the valve piston; wherein the first sensor element is configured to generate a response when the second sensor element moves relative to the piston housing; and wherein at least a portion of the first sensor element is disposed within the piston housing.

9. The back-pressure valve of claim 8 wherein the second sensor element engages the valve piston first end.

10. The back-pressure valve of claim 8 wherein the electrical position sensor further comprises a biasing member configured to bias the plunger rod into engagement with the valve piston; and wherein the plunger rod is not attached to the valve piston.

11. The back-pressure valve of claim 10 wherein the valve piston is generally cylindrical; and wherein the plunger rod contact-end is configured to allow the valve piston to rotate independently of the plunger rod.

12. A surge relief valve system for coupling to a fluid source to protect against injury and damage due to a potential process-upset, surge relief valve system comprising: a surge relief valve for intermittently allowing fluid flow therethrough in response to the process-upset, the valve comprising: a piston housing having a longitudinal axis; a piston disposed within the housing and configured for reciprocal motion along the axis; and a linear transducer comprising a transducer body coupled to the piston housing, a sensor element coupled to the transducer body, and a plunger rod element slidingly received by the transducer body, the plunger rod element comprising a contact-end distal the transducer body to engage the piston; wherein at least a portion of the sensor element is disposed within the piston housing; and wherein the sensor element is configured to generate a response that correlates to the axial position of the piston relative to the piston housing.

13. The surge relief valve system of claim 12 further comprising
a transmitter coupled for communication with the sensor element; and
a valve monitoring unit coupled for communication with the sensor element and the transmitter and configured to quantify the fluid flow passing through the valve.

14. The surge relief valve system of claim 13 wherein the transmitter is disposed within the linear transducer.

15. The surge relief valve system of claim 12 wherein the plunger rod element is configured to follow the reciprocal motion of the piston while allowing the piston to rotate about the axis; wherein the response of the sensor element is correlated to the position of the plunger rod element relative to the sensor element.

16. The surge relief valve system of claim 12 wherein the plunger rod element is disposed at a fixed position relative to the piston and configured to follow the reciprocal motion of the piston in two axial directions; wherein the response of the sensor element is correlated to the position of the plunger rod element relative to the sensor element.

* * * * *